(12) United States Patent
Diemer et al.

(10) Patent No.: US 8,500,588 B2
(45) Date of Patent: Aug. 6, 2013

(54) AUTOMATIC TRANSMISSION GEAR AND CLUTCH ARRANGEMENT

(75) Inventors: John A. Diemer, Farmington Hills, MI (US); Douglas John Dwenger, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 47 days.

(21) Appl. No.: 13/325,886

(22) Filed: Dec. 14, 2011

(65) Prior Publication Data
US 2013/0157797 A1 Jun. 20, 2013

(51) Int. Cl.
*F16H 31/00* (2006.01)

(52) U.S. Cl.
USPC .......................................................... 475/116

(58) Field of Classification Search
None
See application file for complete search history.

(56) References Cited

U.S. PATENT DOCUMENTS

| | | | |
|---|---|---|---|
| 6,843,745 B2 * | 1/2005 | Fritschle | 475/116 |
| 7,699,741 B2 | 4/2010 | Hart et al. | |
| 8,075,441 B2 * | 12/2011 | Hart et al. | 475/282 |
| 8,105,196 B2 * | 1/2012 | Portell et al. | 475/116 |
| 8,197,377 B2 * | 6/2012 | Hart et al. | 475/286 |
| 8,262,526 B2 * | 9/2012 | Portell et al. | 475/116 |
| 2012/0129640 A1 * | 5/2012 | Portell et al. | 475/136 |
| 2012/0322604 A1 * | 12/2012 | Portell et al. | 475/116 |

* cited by examiner

*Primary Examiner* — Dirk Wright

(57) ABSTRACT

A transmission is provided having an input member, an output member, four planetary gear sets, a plurality of coupling members and a plurality of torque-transmitting devices. Further, a hydraulic fluid control circuit is provided for controlling the operation of the plurality of torque-transmitting devices. The hydraulic fluid control circuit receives pressurized hydraulic fluid from a hydraulic fluid pump and has a plurality of fluid passages disposed in the transmission housing, input member and other coupling members.

37 Claims, 4 Drawing Sheets

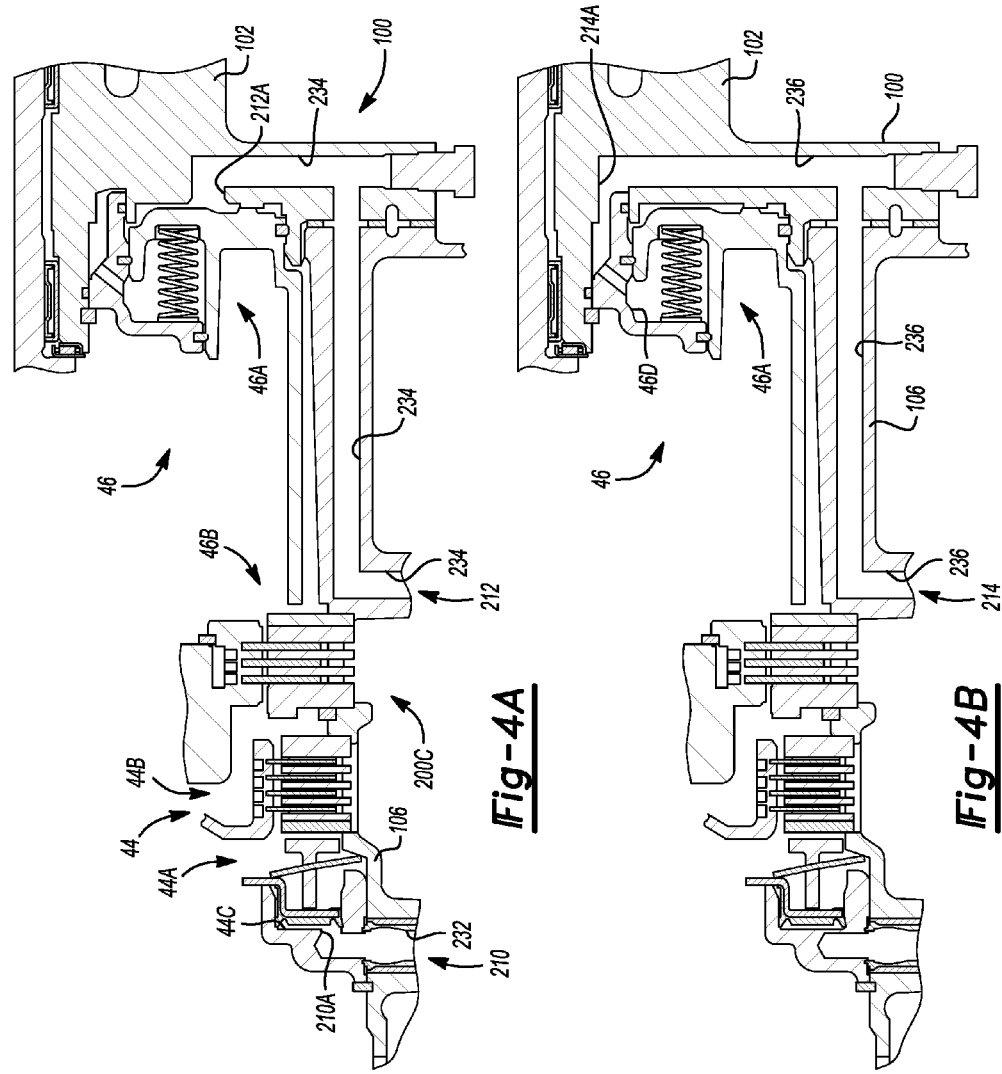

AUTOMATIC TRANSMISSION GEAR AND CLUTCH ARRANGEMENT

FIELD

The present invention relates generally to multiple speed transmissions having a plurality of planetary gear sets and a plurality of torque-transmitting devices and more particularly to a hydraulic control circuit for controlling the operation of the plurality of torque-transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved control systems is essentially constant. More efficient hydraulic controls require less energy and provide improved performance, weight efficiency and driver satisfaction. Accordingly, there is a need for an improved, cost-effective, compact multiple speed transmission.

SUMMARY

A multi-speed transmission is provided including a transmission housing, a first, a second, a third, and a fourth planetary gear sets, a plurality of torque-transmitting mechanisms, a plurality of interconnecting members, an input member, an intermediate rotating member, and an output member.

The transmission housing has a front portion, a center portion, and a rear portion. The front portion includes a portion of each of a first, second, and third apply fluid passages and a first dam fluid passage. The center portion includes a fourth apply fluid passage. The central and rear portion includes a fifth apply fluid passage and a second dam fluid passage.

The planetary gear sets each have a first, a second, and a third member.

The plurality of torque-transmitting mechanisms each have an actuating assembly and a clutch pack for selectively interconnecting one of the first, second, and third members of one of the planetary gear sets with another one of the first members, second members, third members of another of the planetary gear sets, and the transmission housing.

The plurality of interconnecting members each continuously interconnecting one of the first, second, and third members of one of the planetary gear sets with another one of the first members, second members, third members of another of the planetary gear sets.

The input member is continuously interconnected to the second member of the second planetary gear set and rotatably supports the actuating assembly of a first of the plurality of torque transmitting mechanisms. The input member has a plurality of axial bores, a plurality of radial bores, a plurality of chamber ports, a plurality of side ports, and an end port. A first of the plurality of radial bores and a first of the plurality of chamber ports includes a portion of the first apply fluid passage. A first of the plurality of axial bores and a first and second of the plurality of side ports include a portion of the second apply fluid passage. A second of the plurality of axial bores and a third and fourth of the plurality of side ports include a portion of the second apply fluid passage. A third of the plurality of axial bores, a second of the plurality of radial bores, a fifth and sixth of the plurality of side ports, and the end port include a portion of the first dam fluid passage.

The intermediate rotating member rotatably supports the actuating assemblies of a second and third of the plurality of torque transmitting mechanisms. The intermediate rotating member has a center bore, a plurality of radial bores and a plurality of ports. A first of the plurality of radial bores and a first of the plurality of ports include a portion of the second apply fluid passage. A second of the plurality of radial bores and a second of the plurality of ports include a portion of the third fluid apply passage. A third and fourth of a plurality of radial bores, a third and fourth of a plurality of ports, and the central bore include a portion of the first dam fluid passage.

The output member is continuously interconnected to the second member of the fourth planetary gear set.

The first apply fluid passage and the first dam fluid passage are in communication with the actuating assembly of the first of the plurality of torque transmitting mechanisms. The second apply fluid passage and the first dam fluid passage are in communication with the actuating assembly of the second of the plurality of torque transmitting mechanisms. The third apply fluid passage and the first dam fluid passage are in communication with the actuating assembly of the third of a plurality of torque transmitting mechanisms. The fourth apply fluid passage is in communication with the actuating assembly of a fourth of the plurality of the torque transmitting mechanisms. The fifth apply fluid passage and the second dam fluid passage are in communication with the actuating assembly of a fifth of the plurality of torque transmitting mechanisms.

In another example of the present invention, a first of the plurality of the interconnecting members continuously interconnects the first member of the first planetary gear set and the third member of the second planetary gear set. A second of the plurality of the interconnecting members continuously interconnects the second member of the first planetary gear set with the second member of the fourth planetary gear set. A third of the plurality of the interconnecting members continuously interconnects the first member of the second planetary gear set and the first member of the third planetary gear set. A fourth of the plurality of the interconnecting members continuously interconnects the second member of the third planetary gear set with the third member of the fourth planetary gear set, and the intermediate member is continuously interconnects with the first member of the fourth planetary gear set.

In yet another example of the present invention, the first of the plurality of torque-transmitting mechanisms is selectively engageable to interconnect the input member with the intermediate member.

In yet another example of the present invention, the second of the plurality of torque-transmitting mechanisms is selectively engageable to interconnect the intermediate member with the first of the plurality of interconnecting members.

In yet another example of the present invention, the third of the plurality of torque-transmitting mechanisms is selectively engageable to interconnect the intermediate member with the third member of the first planetary gear set.

In yet another example of the present invention, a fourth of the plurality of torque-transmitting mechanisms is selectively engageable to interconnect a third of the plurality of interconnecting members with the transmission housing.

In yet another example of the present invention, a fifth of the plurality of torque-transmitting mechanisms is selectively engageable to interconnect the third member of the third planetary gear set with the transmission housing.

In yet another example of the present invention, the torque-transmitting mechanisms are selectively engageable in combinations of at least two to establish at least eight forward speed ratios and at least one reverse speed ratio between the input member and the output member.

In yet another example of the present invention, the first apply fluid passage includes a first apply passage and a first side port of the front portion of the transmission housing and the first of the plurality of radial bores and the first of a plurality of chamber ports of the input member. The first apply fluid passage is in communication with the first of the plurality of radial bores through the first side port and the first of the plurality of radial bores is in communication with an apply chamber of the actuating assembly of the first of the plurality of torque transmitting mechanisms through first chamber port of the input member.

In yet another example of the present invention, the second apply fluid passage includes a second apply passage of the front portion of the transmission housing, a first of the plurality of axial bores and a first and second of the plurality of side ports of the input member, and a first of the plurality of the radial bores and a first of the plurality of chamber ports of the intermediate rotating member. The second apply fluid passage is in communication with the first of the plurality of axial bores through the first side port and a first annular channel formed between the input member and the transmission housing, the first of the plurality of radial bores is in communication with the first of the plurality of axial bores through the second of the plurality of side ports and a second annular channel formed between the input member and the intermediate rotating member, and the first of the plurality of radial bores is in communication with the apply chamber of the second of the plurality of torque transmitting mechanisms through the first chamber port of the intermediate rotating member.

In yet another example of the present invention, the third apply fluid passage includes a third apply passage of the front portion of the transmission housing, a second of the plurality of axial bores and a third and fourth of the plurality of side ports of the input member, and a second of the plurality of the radial bores and a second of the plurality of chamber ports of the intermediate rotating member. The third apply passage is in communication with the second of the plurality of axial bores through the third of the plurality of side port of the input member and a third annular channel formed between the input member and the transmission housing, the second of the plurality of radial bores is in communication with the second of the plurality of axial bores through the fourth of the plurality of side ports of the input member and a fourth annular channel formed between the input member and the intermediate rotating member, and the second of the plurality of radial bores is in communication with the apply chamber of the third of the plurality of torque transmitting mechanisms through the second of the plurality of chamber ports of the intermediate rotating member.

In yet another example of the present invention, the first dam fluid passage includes a first dam passage of the front portion of the transmission housing, a second radial bore, a third of the plurality of axial bores, a fifth and sixth of the plurality of side ports, and an end port of the input member, and a central bore, a side port, and a third and fourth of the plurality of the radial bores of the intermediate rotating member. The first dam passage is in communication with the dam chamber of the first of the plurality of torque transmitting mechanisms through the second radial bore and the second chamber port of the input member and a second side port of the transmission housing, the first dam passage is in communication with the third of the plurality of axial bores of the input member through an open end of the first dam passage, a fifth annular channel formed between the transmission housing and the input member, and the fifth of the plurality of side ports of the input member, the third radial bore of the intermediate rotating member is in communication with the third axial bore of the input member through a sixth of the plurality of side ports, a radial passage formed through a bearing between the input member and the intermediate rotating member, and the third radial bore is in communication with the dam chamber of the second of the plurality of torque transmitting mechanisms through a fourth chamber port of the seventh interconnecting member, the fourth radial bore of the intermediate rotating member is in communication with the third axial bore of the input member through the side port and the central bore of the intermediate rotating member and the end port of the input member, and the fourth radial bore is in communication with the dam chamber of the third of the plurality of torque transmitting mechanisms through a fifth chamber port of the intermediate rotating member.

In yet another example of the present invention, the fourth apply fluid passage is in communication with the apply chamber of the fourth of the plurality of torque transmitting mechanisms through a chamber port of the transmission housing.

In yet another example of the present invention, the fifth apply fluid passage is in communication with the apply chamber of the fifth of the plurality of torque transmitting mechanisms through a second chamber port of the transmission housing and the second dam fluid passage is in communication with the dam chamber of the fifth of the plurality of torque transmitting mechanisms through a third chamber port of the transmission housing.

In yet another example of the present invention, the first members of the planetary gear sets are sun gears, the second members of the planetary gear sets are ring gears, and the third members of the planetary gear sets are carrier members.

Further features and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way;

FIG. 4A is a cross-section of another plurality of torque transmitting mechanisms and another portion of the transmission housing illustrating another portion of a fluid routing system for an eight speed transmission in accordance with an embodiment of the present invention; and FIG. 4B is a cross-section of the other plurality of torque transmitting mechanisms and the other portion of the transmission housing illustrating another portion of a fluid routing system for an eight speed transmission in accordance with an embodiment of the present invention.

DETAILED DESCRIPTION

The following description is merely exemplary in nature and is not intended to limit the present disclosure, application, or uses.

Figure 1:
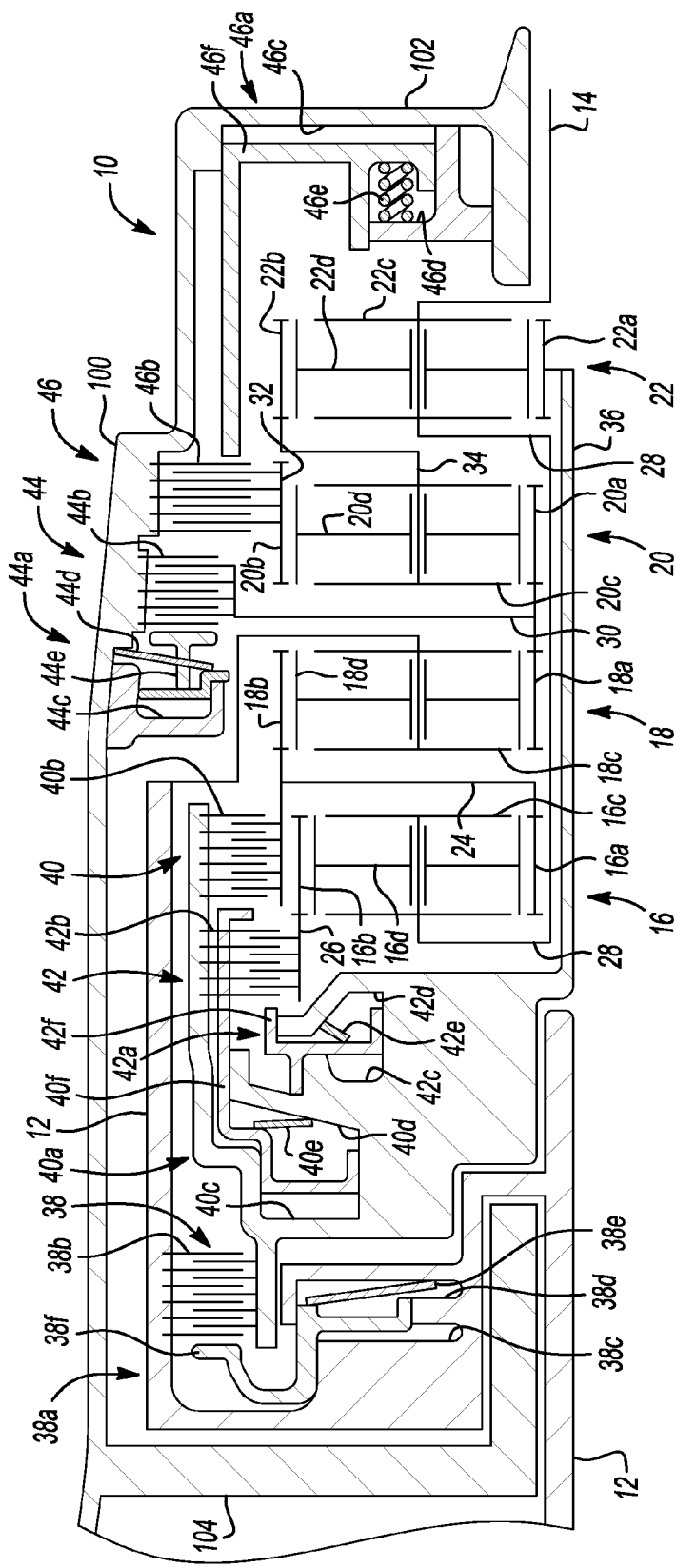
FIG. 1 is a schematic diagram of an embodiment of an eight speed transmission according to the present invention.

Referring to the drawings, wherein like reference numbers refer to like components, in FIG. 1 a multi-speed transmission 10 is illustrated. The transmission 10 includes an input member 12 and an output member 14. In the present embodiment, the output member 14 is a shaft and the input member 12 is a combination of a shaft and a rotating interconnecting member. The input member 12 is continuously connected to an engine (not shown) or torque converter (not shown). The output member 14 is continuously connected with the final drive unit or transfer case (not shown).

In a preferred embodiment of the present invention, the transmission 10 includes four planetary gear sets 16, 18, 20 and 22 disposed in a transmission housing 100. The planetary gear sets 16, 18, 20 and 22 are connected between the input member 12 and the output member 14.

More specifically, the fourth planetary gear set 22 is disposed adjacent a rear portion 102 of the transmission housing 100. The third planetary gear set 20 is disposed adjacent the fourth planetary gear set 22. The second planetary gear set 18 is disposed proximate to the third planetary gear set 20. The first planetary gear set 16 is disposed proximate the second planetary gear set 18.

The first planetary gear set 16 includes a sun gear member 16A, a ring gear member 16B, and a carrier member 16C that rotatably supports a set of pinion gears 16D (only one shown). Sun gear member 16A is connected for common rotation with a first shaft or interconnecting member 24. Ring gear member 16B is connected for common rotation with a second shaft or interconnecting member 26. Carrier member 16C is connected for common rotation with a third shaft or interconnecting member 28. Pinion gears 16D are each configured to intermesh with both sun gear member 16A and ring gear member 16B.

The second planetary gear set 18 includes a sun gear member 18A, a ring gear member 18B, and a carrier member 18C that rotatably supports a set of pinion gears 18D. Sun gear member 18A is connected for common rotation with a fourth shaft or interconnecting member 30. Ring gear member 18B is connected for common rotation with the first shaft or interconnecting member 24. Carrier member 18C is connected for common rotation with the input member 12. Pinion gears 18D are each configured to intermesh with both sun gear member 18A and ring gear member 18B.

The third planetary gear set 20 includes a sun gear member 20A, a ring gear member 20B, and a carrier member 20C that rotatably supports a set of pinion gears 20D. Sun gear member 20A is connected for common rotation with the fourth shaft or interconnecting member 30. Ring gear member 20B is connected for common rotation with a fifth shaft or interconnecting member 32. Carrier member 20C is connected for common rotation with a sixth shaft or interconnecting member 34. Pinion gears 20D are each configured to intermesh with both sun gear member 20A and ring gear member 20B.

The fourth planetary gear set 22 includes a sun gear member 22A, a ring gear member 22B, and a carrier member 22C that rotatably supports a set of pinion gears 22D. Sun gear member 22A is connected for common rotation with the seventh shaft of intermediate member 36. Ring gear member 22B is connected for common rotation with the sixth shaft or interconnecting member 34. Carrier member 22C is connected for common rotation with the output member 14 and the third interconnecting member 28. Pinion gears 22D are each configured to intermesh with both sun gear member 22A and ring gear member 22B.

The transmission 10 includes a plurality of torque-transmitting mechanisms or devices allowing for selective coupling of shafts or interconnecting members, members of the planetary gear sets and the transmission housing 100. More specifically, transmission 10 includes a first clutch 38, a second clutch 40, a third clutch 42, a first brake 44 and a second brake 46. For example, the first clutch 38 is selectively engageable to connect the input member 12 to the seventh shaft of intermediate member 36 for common rotation between the input member 12 and the sun gear member 22A of the fourth planetary gear set 22. The second clutch 40 is selectively engageable to connect the first shaft or interconnecting member 24 to the seventh shaft of intermediate member 36 for common rotation between the sun gear member 16A of the first planetary gear set 16, the ring gear member 18B of the second planetary gear set 18 and the sun gear member 22A of the fourth planetary gear set 22. The third clutch 42 is selectively engageable to connect the second shaft or interconnecting member 26 to the seventh shaft of intermediate member 36 for common rotation between the ring gear member 16B of the first planetary gear set 16 and the sun gear member 22A of the fourth planetary gear set. The first brake 44 is selectively engageable to connect the fourth shaft or interconnecting member 30 to the transmission housing 100 to restrict rotation of the sun gear member 18A of the second planetary gear set 18 and sun gear member 20A of the third planetary gear set 20 relative to the transmission housing 100. The second brake 46 is selectively engageable to connect the fifth shaft or interconnecting member 32 to the transmission housing 100 to restrict rotation of the ring gear member 20B of the third planetary gear set 20 relative to the transmission housing 100.

The transmission 10 is capable of transmitting torque from the input member 12 to the output member 14 in at least eight forward torque ratios and one reverse torque ratio. Each of the forward torque ratios and the reverse torque ratios are attained by engagement of one or more of the torque-transmitting mechanisms (i.e. first clutch 38, second clutch 40, third clutch 42, first brake 44 and second brake 46). Those skilled in the art will readily understand that a different speed ratio is associated with each torque ratio. Thus, at least eight forward speed ratios and at least one reverse speed ratio may be attained by the transmission 10.

With continuing reference to FIG. 1, the location of clutches 38, 40, 42, and brakes 44, 46 along the input member 12 and the seventh shaft of intermediate member 36 and relative to the planetary gear sets 16, 18, 20, 22 will now be described. The first, second, and third clutches 38, 40, 42 and first and second brake 44, 46 are arranged coaxially with the input member 12 and the seventh shaft of intermediate member 36. The first clutch 38 is located proximate a front portion 104 of the transmission housing 100 and is supported by the input member 12. The second clutch 40 is located proximate the first clutch 38 and input member 12 and is supported by the seventh shaft of intermediate member 36. The third clutch 42 is disposed between the second clutch 40 and the first planetary gear set 16 and is supported by the seventh shaft of intermediate member 36. The first brake 44 is located radially outward from the second planetary gear set 18 and the third planetary gear set 20 and is supported by the transmission housing 100. The second brake 46 is located adjacent the first brake 44 and radially outward from the third planetary gear set 20 and is supported by the transmission housing 100.

The first clutch 38 includes an actuating assembly 38A and a clutch pack 38B. The actuating assembly 38A of the first clutch 38 includes an apply chamber 38C, a dam chamber 38D, a piston return spring 38E, and a piston 38F. The actuating assembly 38A is rotatably supported by the input member 12. The clutch pack 38B includes a plurality of friction discs or rings with alternating discs splined to the input member 12 and the seventh shaft or member 36. The piston 38F of the actuating assembly 38A engages the clutch pack 38B to force the plurality of alternating friction disks together to interconnect the carrier member 18C of the second planetary gear set 18 and the input member 12 with the seventh shaft of intermediate member 36 and the sun gear member 22A of the fourth planetary gear set 22.

The second clutch 40 includes an actuating assembly 40A and a clutch pack 40B. The actuating assembly 40A of the third clutch 40 includes an apply chamber 40C, a dam chamber 40D, a piston return spring 40E, and a piston 40F. The actuating assembly 40A is rotatably supported by the seventh shaft of intermediate member 36. The clutch pack 40B includes a plurality of friction discs or rings with alternating discs splined to the seventh shaft of intermediate member 36 and the first shaft or interconnecting member 24. The piston 40F of the actuating assembly 40A engages the clutch pack 40B to interconnect the seventh shaft of intermediate member 36 and the sun gear member 22A of the fourth planetary gear set 22 with the first shaft or interconnecting member 24, the sun gear member 16A of the first planetary gear set 16, and the ring gear member 18B of the second planetary gear set.

The third clutch 42 includes an actuating assembly 42A and a clutch pack 42B. The actuating assembly 42A of the third clutch 42 includes an apply chamber 42C, a dam chamber 42D, a piston return spring 42E, and a piston 42F. The actuating assembly 42A is rotatably supported by the seventh shaft of intermediate member 36. The clutch pack 42B includes a plurality of friction discs or rings with alternating discs splined to the second shaft or interconnecting member 26 and the seventh shaft of intermediate member 36. The piston 42F of the actuating assembly 42A engages the clutch pack 42B to interconnect the seventh shaft of intermediate member 36 and the sun gear member 22A of the fourth planetary gear set 22 with the second shaft or interconnecting member 26 and the ring gear member 16B of the first planetary gear set 16.

The first brake 44 includes an actuating assembly 44A and a clutch pack 44B. The actuating assembly 44A of the first brake 44 includes an apply chamber 44C, a piston return spring 44D, and a piston 44E. The actuating assembly 44A is rotatably supported by the transmission housing 100. The clutch pack 44B includes a plurality of friction discs or rings with alternating discs splined to the transmission housing 100 and the fourth shaft or interconnecting member 30. The piston 44E of the actuating assembly 44A engages the clutch pack 44B to interconnect the fourth shaft or interconnecting member 30 and the sun gear members 18A, 20A of the second and third planetary gear sets 18, 20 with the transmission housing 100.

The second brake 46 includes an actuating assembly 46A and a clutch pack 46B. The actuating assembly 46A of the second brake 46 includes an apply chamber 46C, a dam chamber 46D, a piston return spring 46E, and a piston 46F. The actuating assembly 46A is rotatably supported by the rear portion 102 of the transmission housing 100. The clutch pack 46B includes a plurality of friction discs or rings with alternating discs splined to the transmission housing 100 and the fifth shaft or interconnecting member 32. The piston 46F of the actuating assembly 46A engages the clutch pack 46B to interconnect the fifth shaft or interconnecting member 32 and the ring gear member 20B of the third planetary gear sets 20 with the transmission housing 100.

Referring now to FIGS. 2, 3, 4A, and 4B, a hydraulic control circuit 200 is illustrated and will now be described. More specifically, FIGS. 2, 3, 4A, and 4B include cross-sectional views of the input member 12, the seventh shaft of intermediate member 36, the output member 14, and the transmission housing 100. The hydraulic control circuit 200 contains hydraulic fluid that is pressurized by a hydraulic fluid pump (not shown) and generates hydraulic control signals to actuate the clutches 38, 40, 42 and brakes 44, 46. The hydraulic control circuit 200 is formed by passages and ports of the input member 12, the seventh shaft of intermediate member 36, the output member 14, and transmission housing 100. The hydraulic circuit 200 includes a first portion 200A, a second portion 200B and a third portion 200C. The second portion 200B, illustrated in FIG. 3, includes an apply circuit 206 for the first clutch 38 and a dam circuit 208 for the first, second and third clutches 38, 40, 42. The third portion 200C, illustrated in FIGS. 4A and 4B, includes an apply circuit 210 for the first brake 44, an apply circuit 212 for the second brake 46, and a dam circuit 214 for the second brake 46.

Figure 2:
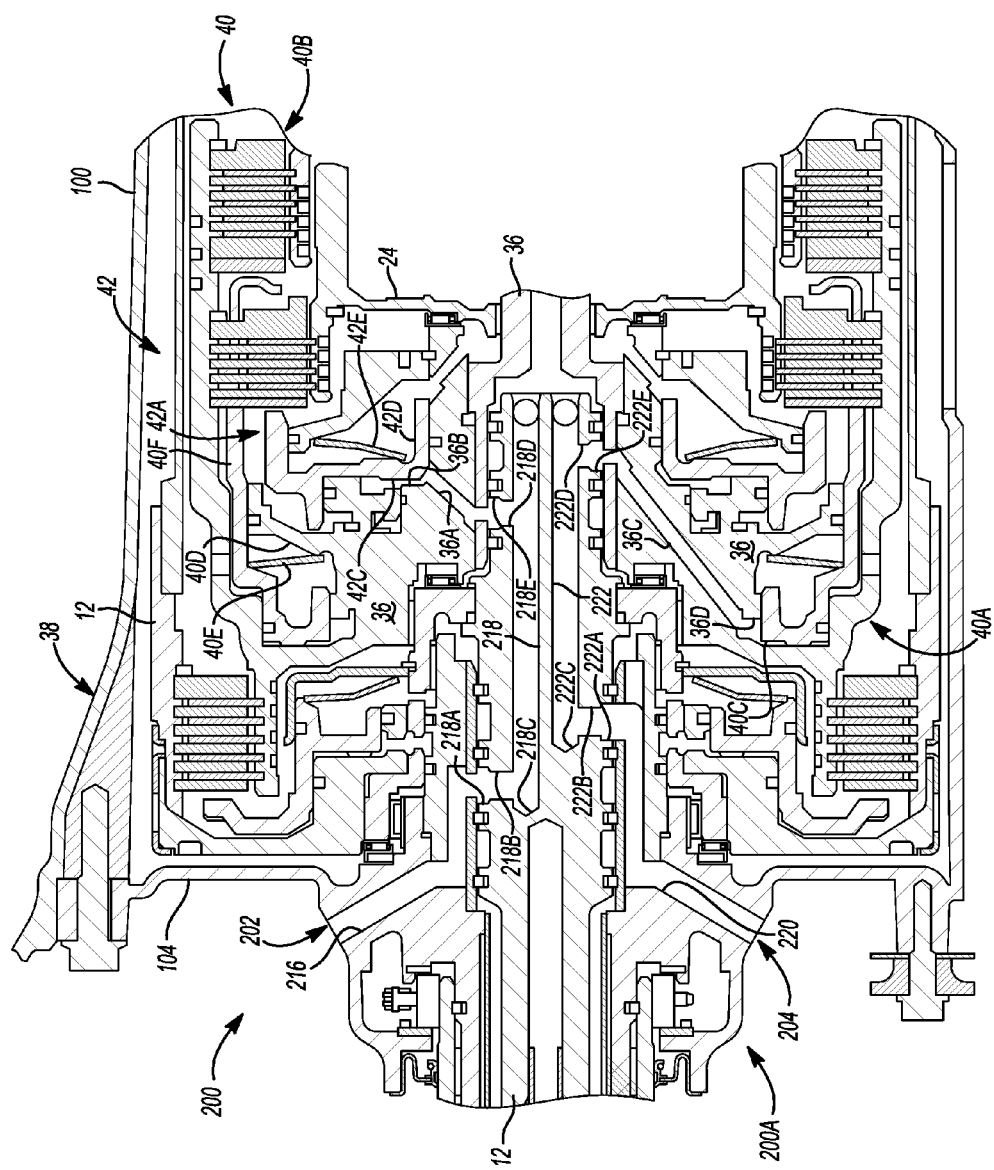
FIG. 2 is a cross-section of an input shaft, a shaft or interconnecting member, a plurality of torque transmitting mechanisms, and a portion of a transmission housing illustrating a portion of a fluid routing system for an eight speed transmission in accordance with an embodiment of the present invention.

Referring now to FIG. 2, the first portion 200A of the hydraulic circuit 200 is illustrated and explained in more detail. The first portion 200A of the hydraulic circuit 200 includes an apply circuit 202 for the third clutch 42 and an apply circuit 204 for the second clutch 40. The apply circuit 202 of the third clutch 42 is formed by the front portion 104 of the transmission housing 100, the input member 12, and the seventh shaft of intermediate member 36. More specifically, the apply circuit 202 of the third clutch 42 is defined by an apply passage 216 of the third clutch 42 disposed in the front portion 104 of the transmission housing 100, a first axial bore 218 disposed in the input member 12 and an radial bore 36A disposed in the seventh shaft of intermediate member 36. The apply passage 216 communicates with the first axial bore 218 through a first annular channel 218A and a side port 218B at a first end 218C of the first axial bore 218. The first axial bore 218 communicates with the radial bore 36A through a side port 218D and a second annular channel 218E. The radial bore 36A communicates with the apply chamber 42C of the actuating assembly 42A of the third clutch 42 through a first chamber port 36B of the seventh shaft of intermediate member 36.

The apply circuit 204 of the second clutch 40 is formed by the front portion 104 of the transmission housing 100, the input member 12, and the seventh shaft of intermediate member 36. More specifically, the apply circuit 204 of the second clutch 40 is defined by an apply passage 220 of the second clutch 40 disposed in the front portion 104 of the transmission housing 100, a second axial bore 222 disposed in the input member 12 and an radial bore 36C disposed in the seventh shaft of intermediate member 36. The apply passage 220 communicates with the second axial bore 222 through a second annular channel 222A and a side port 222B at a first end 222C of the second axial bore 222. The second axial bore 222 communicates with the radial bore 36C through a side port 222D and a second annular channel 222E of the second axial bore 222. The radial bore 36C communicates with the apply chamber 40C of the actuating assembly 40A of the second clutch 40 through a second chamber port 36D of the seventh shaft of intermediate member 36.

Figure 3:
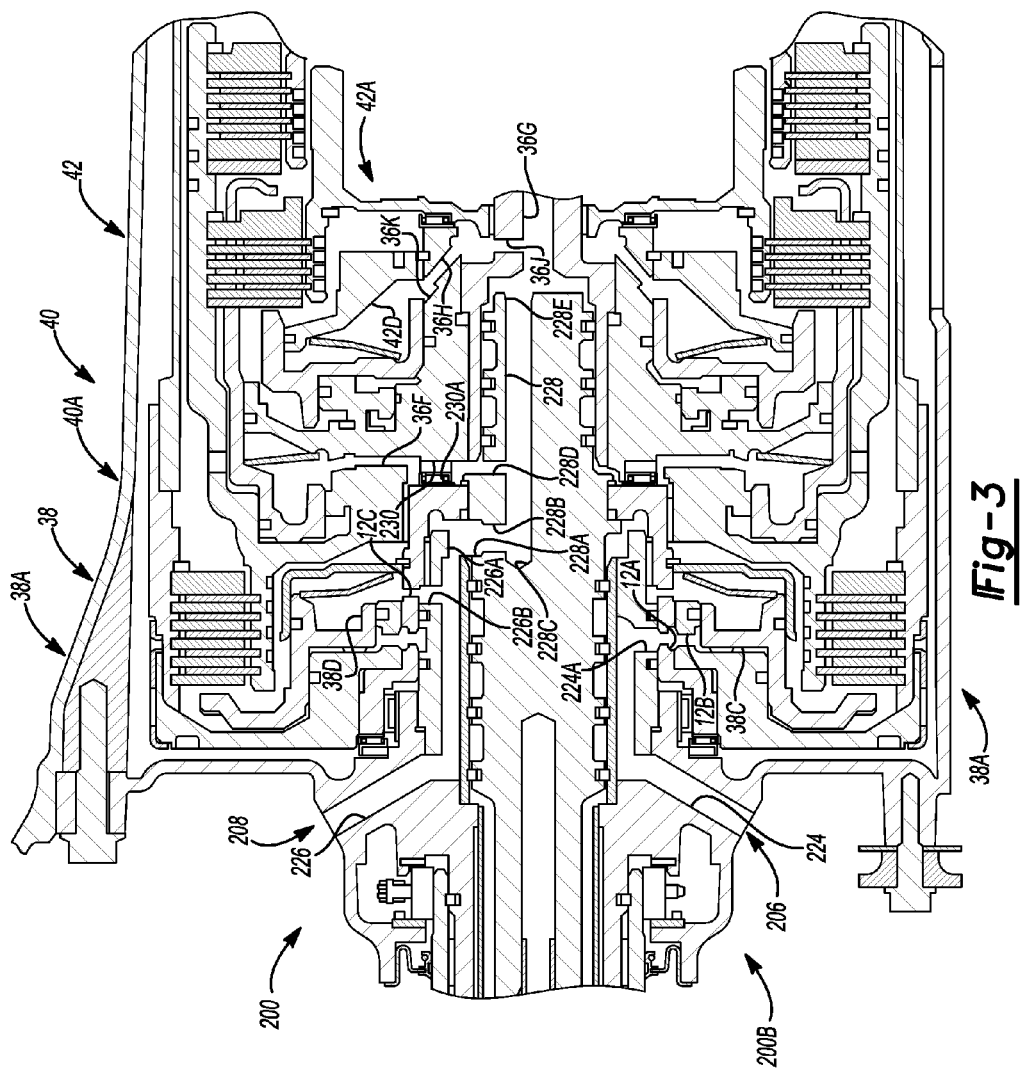
FIG. 3 is another cross-section of the input shaft, the shaft or interconnecting member, the plurality of torque transmitting mechanisms, and the portion of the transmission housing illustrating another portion of a fluid routing system for an eight speed transmission in accordance with an embodiment of the present invention.

Referring now to FIG. 3, the second portion 200B of the hydraulic circuit 200 is illustrated and explained in more detail. The second portion 200B of the hydraulic circuit 200 includes an apply circuit 206 for the first clutch 38 and a dam circuit 208 for each of the first, second, and third clutches 38, 40, 42. The apply circuit 206 of the first clutch 38 is formed by the front portion 104 of the transmission housing 100 and the input member 12. More specifically, the apply circuit 206 of the first clutch 38 is defined by an apply passage 224 of the first clutch 38 disposed in the front portion 104 of the transmission housing 100, and an radial bore 12A disposed in the input member 12. The apply passage 224 communicates with the radial bore 12A through a side port 224A. The radial bore 12A communicates with the apply chamber 38C of the actuating assembly 38A of the first clutch 38 through a third chamber port 12B of the input member 12.

The dam circuit 208 of the first, second, and third clutches 38, 40, 42 is formed by the front portion 104 of the transmission housing 100, the input member 12, and the seventh shaft of intermediate member 36. More specifically, dam circuit 208 of the first, second, and third clutches 38, 40, 42 is defined by an apply passage 226 disposed in the front portion 104 of the transmission housing 100, a third axial bore 228 disposed in the input member 12, an radial bore 12C disposed in the input member 12, an radial passage 230 formed by a bearing 230A between the input member 12 and the seventh shaft of intermediate member 36, and a center bore 36G and an radial bore 36H disposed in the seventh shaft of intermediate member 36. The dam passage 226 communicates with the dam chamber 38D of the actuating assembly 38A of the first clutch 38 through a port 226B of the front portion 104 of the transmission housing and a radial bore or chamber port 12C of the input member 12. The dam passage 226 further communicates with the third axial bore 228 through an open end 226A of the dam passage, a third annular channel 228A and a side port 228B at a first end 228C of the third axial bore 228. The third axial bore 228 communicates with the radial passage 230 through a side port 228D and an annual channel 228E. The radial passage 230 communicates with the dam chamber 40D of the actuating assembly 40A of the second clutch 40 through a radial bore or chamber port 36F of the seventh shaft of intermediate member 36. The third axial bore 228 further communicates with the center bore 36G disposed in the seventh shaft of intermediate member 36 through and open end 228E of the third axial bore 228 of the input member 12. The center bore 36G communicates with the radial bore 36H through a side port 36J. The radial bore 36H communicates with the dam chamber 42D of the actuating assembly 42A of the third clutch 42 through a radial bore or chamber port 36K of the seventh shaft of intermediate member 36.

Referring now to FIGS. 4A and 4B, the third portion 200C of the hydraulic circuit 200 is illustrated and explained in more detail. The third portion 200C of the hydraulic circuit 200 includes an apply circuit 210 for the first brake 44, an apply circuit 212 for the second brake 46 and a dam circuit 214 for the second brake 46. The apply circuit 210 of the first brake 44 is formed by a central portion 106 of the transmission housing 100. More specifically, the apply circuit 210 of the first brake 44 is defined by an apply passage 232 of the first brake 44 disposed in the central portion 106 of the transmission housing 100. The apply passage 232 communicates with the apply chamber 44C of the actuating assembly 44A of the first brake 44 through a port 210A of the central portion 106 of the transmission housing 100.

The apply circuit 212 of the second brake 46 is formed by the central portion 106 and the rear portion 102 of the transmission housing 100. More specifically, the apply circuit 212 of the second brake 46 is defined by an apply passage 234 of the second brake 46 disposed in the central portion 106 and the rear portion 102 of the transmission housing 100. The apply passage 234 communicates with the apply chamber 46C of the actuating assembly 46A of the second brake 46 through a port 212A of the rear portion 102 of the transmission housing 100.

Referring now to FIG. 4B, the dam circuit 214 of the second brake 46 is illustrated and will be described in more detail. The dam circuit 214 of the second brake 46 is formed by the central portion 106 and the rear portion 102 of the transmission housing 100. More specifically, the dam circuit 214 of the second brake 46 is defined by a dam passage 236 of the second brake 46 disposed in the central portion 106 and the rear portion 102 of the transmission housing 100. The dam passage 236 communicates with the dam chamber 46D of the actuating assembly 46A of the second brake 46 through a port 214A of the rear portion 102 of the transmission housing 100.

The description of the invention is merely exemplary in nature and variations that do not depart from the gist of the invention are intended to be within the scope of the invention. Such variations are not to be regarded as a departure from the spirit and scope of the invention.

What is claimed is:

1. A multi-speed transmission comprising:
    a transmission housing having a front portion, a center portion, and a rear portion, the front portion including a portion of each of a first, second, and third apply fluid passages and a first dam fluid passage, the center portion including a fourth apply fluid passage, and the central and rear portion including a fifth apply fluid passage and a second dam fluid passage; and
    a first, a second, a third, and a fourth planetary gear sets each having a first, a second, and a third members;
    a plurality of torque-transmitting mechanisms each having an actuating assembly and a clutch pack for selectively interconnecting one of the first, second, and third members of one of the planetary gear sets with another one of the first members, second members, third members of another of the planetary gear sets, and the transmission housing;
    a plurality of interconnecting members each continuously interconnecting one of the first, second, and third members of one of the planetary gear sets with another one of the first members, second members, third members of another of the planetary gear sets;
    an input member continuously interconnected to the second member of the second planetary gear set and rotatably supporting the actuating assembly of a first of the plurality of torque transmitting mechanisms, the input member having a plurality of axial bores, a plurality of radial bores, a plurality of chamber ports, a plurality of side ports, and an end port, wherein a first of the plurality of radial bores and a first of the plurality of chamber ports includes a portion of the first apply fluid passage, a first of the plurality of axial bores and a first and second of the plurality of side ports include a portion of the second apply fluid passage, a second of the plurality of axial bores and a third and fourth of the plurality of side ports include a portion of the second apply fluid passage, and a third of the plurality of axial bores, a second of the plurality of radial bores, a fifth and sixth of the plurality of side ports, and the end port include a portion of the first dam fluid passage;

an intermediate rotating member rotatably supporting the actuating assemblies of a second and third of the plurality of torque transmitting mechanisms, the intermediate rotating member having a center bore, a plurality of radial bores and a plurality of ports, wherein a first of the plurality of radial bores and a first of the plurality of ports include a portion of the second apply fluid passage, a second of the plurality of radial bores and a second of the plurality of ports include a portion of the third fluid apply passage, and a third and fourth of a plurality of radial bores, a third and fourth of a plurality of ports, and the central bore include a portion of the first dam fluid passage; and an output member continuously interconnected to the second member of the fourth planetary gear set; and wherein the first apply fluid passage and the first dam fluid passage are in communication with the actuating assembly of the first of the plurality of torque transmitting mechanisms, the second apply fluid passage and the first dam fluid passage are in communication with the actuating assembly of the second of the plurality of torque transmitting mechanisms, the third apply fluid passage and the first dam fluid passage are in communication with the actuating assembly of the third of a plurality of torque transmitting mechanisms, the fourth apply fluid passage is in communication with the actuating assembly of a fourth of the plurality of the torque transmitting mechanisms, and the fifth apply fluid passage and the second dam fluid passage are in communication with the actuating assembly of a fifth of the plurality of torque transmitting mechanisms.

2. The multi-speed transmission of claim 1 wherein a first of the plurality of the interconnecting members continuously interconnecting the first member of the first planetary gear set and the third member of the second planetary gear set, a second of the plurality of the interconnecting members continuously interconnecting the second member of the first planetary gear set with the second member of the fourth planetary gear set, a third of the plurality of the interconnecting members continuously interconnecting the first member of the second planetary gear set and the first member of the third planetary gear set, a fourth of the plurality of the interconnecting members continuously interconnecting the second member of the third planetary gear set with the third member of the fourth planetary gear set, and the intermediate member is continuously interconnected with the first member of the fourth planetary gear set.

3. The multi-speed transmission of claim 2 wherein the first of the plurality of torque-transmitting mechanisms is selectively engageable to interconnect the input member with the intermediate member.

4. The multi-speed transmission of claim 3 wherein the second of the plurality of torque-transmitting mechanisms is selectively engageable to interconnect the intermediate member with the first of the plurality of interconnecting members.

5. The multi-speed transmission of claim 4 wherein the third of the plurality of torque-transmitting mechanisms is selectively engageable to interconnect the intermediate member with the third member of the first planetary gear set.

6. The multi-speed transmission of claim 5 wherein a fourth of the plurality of torque-transmitting mechanisms is selectively engageable to interconnect a third of the plurality of interconnecting members with the transmission housing.

7. The multi-speed transmission of claim 6 wherein a fifth of the plurality of torque-transmitting mechanisms is selectively engageable to interconnect the third member of the third planetary gear set with the transmission housing.

8. The multi-speed transmission of claim 1 wherein the torque-transmitting mechanisms are selectively engageable in combinations of at least two to establish at least eight forward speed ratios and at least one reverse speed ratio between the input member and the output member.

9. The multi-speed transmission of claim 1 wherein the first apply fluid passage includes a first apply passage and a first side port of the front portion of the transmission housing and the first of the plurality of radial bores and the first of a plurality of chamber ports of the input member, and wherein the first apply fluid passage is in communication with the first of the plurality of radial bores through the first side port and the first of the plurality of radial bores is in communication with an apply chamber of the actuating assembly of the first of the plurality of torque transmitting mechanisms through first chamber port of the input member.

10. The multi-speed transmission of claim 9 wherein the second apply fluid passage includes a second apply passage of the front portion of the transmission housing, a first of the plurality of axial bores and a first and second of the plurality of side ports of the input member, and a first of the plurality of the radial bores and a first of the plurality of chamber ports of the intermediate rotating member, and wherein the second apply fluid passage is in communication with the first of the plurality of axial bores through the first side port and a first annular channel formed between the input member and the transmission housing, the first of the plurality of radial bores is in communication with the first of the plurality of axial bores through the second of the plurality of side ports and a second annular channel formed between the input member and the intermediate rotating member, and the first of the plurality of radial bores is in communication with the apply chamber of the second of the plurality of torque transmitting mechanisms through the first chamber port of the intermediate rotating member.

11. The multi-speed transmission of claim 10 wherein the third apply fluid passage includes a third apply passage of the front portion of the transmission housing, a second of the plurality of axial bores and a third and fourth of the plurality of side ports of the input member, and a second of the plurality of the radial bores and a second of the plurality of chamber ports of the intermediate rotating member, and wherein the third apply passage is in communication with the second of the plurality of axial bores through the third of the plurality of side port of the input member and a third annular channel formed between the input member and the transmission housing, the second of the plurality of radial bores is in communication with the second of the plurality of axial bores through the fourth of the plurality of side ports of the input member and a fourth annular channel formed between the input member and the intermediate rotating member, and the second of the plurality of radial bores is in communication with the apply chamber of the third of the plurality of torque transmitting mechanisms through the second of the plurality of chamber ports of the intermediate rotating member.

12. The multi-speed transmission of claim 11 wherein the first dam fluid passage includes a first dam passage of the front portion of the transmission housing, a second radial bore, a third of the plurality of axial bores, a fifth and sixth of the plurality of side ports, and an end port of the input member, and a central bore, a side port, and a third and fourth of the plurality of the radial bores of the intermediate rotating member, wherein the first dam passage is in communication with the dam chamber of the first of the plurality of torque transmitting mechanisms through the second radial bore and the second chamber port of the input member and a second side port of the transmission housing, the first dam passage is in communication with the third of the plurality of axial bores of the input member through an open end of the first dam passage, a fifth annular channel formed between the transmission housing and the input member, and the fifth of the plurality of side ports of the input member, the third radial bore of the intermediate rotating member is in communication with the third axial bore of the input member through a sixth of the plurality of side ports, a radial passage formed through a bearing between the input member and the intermediate rotating member, and the third radial bore is in communication with the dam chamber of the second of the plurality of torque transmitting mechanisms through a fourth chamber port of the seventh interconnecting member, the fourth radial bore of the intermediate rotating member is in communication with the third axial bore of the input member through the side port and the central bore of the intermediate rotating member and the end port of the input member, and the fourth radial bore is in communication with the dam chamber of the third of the plurality of torque transmitting mechanisms through a fifth chamber port of the intermediate rotating member.

13. The multi-speed transmission of claim 12 wherein the fourth apply fluid passage is in communication with the apply chamber of the fourth of the plurality of torque transmitting mechanisms through a chamber port of the transmission housing.

14. The multi-speed transmission of claim 13 wherein the fifth apply fluid passage is in communication with the apply chamber of the fifth of the plurality of torque transmitting mechanisms through a second chamber port of the transmission housing and the second dam fluid passage is in communication with the dam chamber of the fifth of the plurality of torque transmitting mechanisms through a third chamber port of the transmission housing.

15. The multi-speed transmission of claim 14 wherein the first members of the planetary gear sets are sun gears, the second members of the planetary gear sets are ring gears, and the third members of the planetary gear sets are carrier members.

16. A multi-speed transmission comprising:
a transmission housing having a front portion, a center portion, and a rear portion, the front portion including a portion of each of a first, second, and third apply fluid passages and a first dam fluid passage, the center portion including a fourth apply fluid passage, and the central and rear portion including a fifth apply fluid passage and a second dam fluid passage; and
a first, a second, a third, and a fourth planetary gear sets each having a first, a second, and a third members;
a plurality of torque-transmitting mechanisms each having an actuating assembly and a clutch pack for selectively interconnecting one of the first, second, and third members of one of the planetary gear sets with another one of the first members, second members, third members of another of the planetary gear sets, and the transmission housing;
an input member continuously interconnected to the second member of the second planetary gear set and rotatably supporting the actuating assembly of a first of the plurality of torque transmitting mechanisms, the input member having a plurality of axial bores, a plurality of radial bores, a plurality of chamber ports, a plurality of side ports, and an end port, wherein a first of the plurality of radial bores and a first of the plurality of chamber ports includes a portion of the first apply fluid passage, a first of the plurality of axial bores and a first and second of the plurality of side ports include a portion of the second apply fluid passage, a second of the plurality of axial bores and a third and fourth of the plurality of side ports include a portion of the second apply fluid passage, and a third of the plurality of axial bores, a second of the plurality of radial bores, a fifth and sixth of the plurality of side ports, and the end port include a portion of the first dam fluid passage;
an intermediate rotating member rotatably supporting the actuating assemblies of a second and third of the plurality of torque transmitting mechanisms, the intermediate rotating member having a center bore, a plurality of radial bores and a plurality of ports, wherein a first of the plurality of radial bores and a first of the plurality of ports include a portion of the second apply fluid passage, a second of the plurality of radial bores and a second of the plurality of ports include a portion of the third fluid apply passage, and a third and fourth of a plurality of radial bores, a third and fourth of a plurality of ports, and the central bore include a portion of the first dam fluid passage;
a first interconnecting member continuously interconnecting the first member of the first planetary gear set and the third member of the second planetary gear set;
a second interconnecting member continuously interconnecting the second member of the first planetary gear set with the second member of the fourth planetary gear set;
a third interconnecting member continuously interconnecting the first member of the second planetary gear set and the first member of the third planetary gear set;
a fourth interconnecting member continuously interconnecting the second member of the third planetary gear set with the third member of the fourth planetary gear set; and
an output member continuously interconnected to the second member of the fourth planetary gear set; and
wherein the first apply fluid passage and the first dam fluid passage are in communication with the actuating assembly of the first of the plurality of torque transmitting mechanisms, the second apply fluid passage and the first dam fluid passage are in communication with the actuating assembly of the second of the plurality of torque transmitting mechanisms, the third apply fluid passage and the first dam fluid passage are in communication with the actuating assembly of the third of a plurality of torque transmitting mechanisms, the fourth apply fluid passage is in communication with the actuating assembly of a fourth of the plurality of the torque transmitting mechanisms, and the fifth apply fluid passage and the second dam fluid passage are in communication with the actuating assembly of a fifth of the plurality of torque transmitting mechanisms.

17. The multi-speed transmission of claim 16 wherein the first of the five torque-transmitting mechanisms is selectively engageable to interconnect the input member with the intermediate rotating member.

18. The multi-speed transmission of claim 17 wherein the second of the five torque-transmitting mechanisms is selectively engageable to interconnect the intermediate rotating member with first interconnecting member.

19. The multi-speed transmission of claim 18 wherein the third of the five torque-transmitting mechanisms is selectively engageable to interconnect the intermediate rotating member with the third member of the first planetary gear set.

20. The multi-speed transmission of claim 19 wherein the fourth of the five torque-transmitting mechanisms is selectively engageable to interconnect the third interconnecting member with the transmission housing.

21. The multi-speed transmission of claim 20 wherein the fifth of the five torque-transmitting mechanisms is selectively engageable to interconnect the third member of the third planetary gear set with the transmission housing.

22. The multi-speed transmission of claim 21 wherein the first members of the planetary gear sets are sun gears, the second members of the planetary gear sets are ring gears, and the third members of the planetary gear sets are carrier members.

23. The multi-speed transmission of claim 16 wherein the torque-transmitting mechanisms are selectively engageable in combinations of at least two to establish at least eight forward speed ratios and at least one reverse speed ratio between the input member and the output member.

24. The multi-speed transmission of claim 16 wherein the first apply fluid passage includes a first apply passage and a first side port of the front portion of the transmission housing and the first of the plurality of radial bores and the first of a plurality of chamber ports of the input member, and wherein the first apply fluid passage is in communication with the first of the plurality of radial bores through the first side port and the first of the plurality of radial bores is in communication with an apply chamber of the actuating assembly of the first of the plurality of torque transmitting mechanisms through first chamber port of the input member.

25. The multi-speed transmission of claim 24 wherein the second apply fluid passage includes a second apply passage of the front portion of the transmission housing, a first of the plurality of axial bores and a first and second of the plurality of side ports of the input member, and a first of the plurality of the radial bores and a first of the plurality of chamber ports of the intermediate rotating member, and wherein the second apply fluid passage is in communication with the first of the plurality of axial bores through the first side port and a first annular channel formed between the input member and the transmission housing, the first of the plurality of radial bores is in communication with the first of the plurality of axial bores through the second of the plurality of side ports and a second annular channel formed between the input member and the intermediate rotating member, and the first of the plurality of radial bores is in communication with the apply chamber of the second of the plurality of torque transmitting mechanisms through the first chamber port of the intermediate rotating member.

26. The multi-speed transmission of claim 25 wherein the third apply fluid passage includes a third apply passage of the front portion of the transmission housing, a second of the plurality of axial bores and a third and fourth of the plurality of side ports of the input member, and a second of the plurality of the radial bores and a second of the plurality of chamber ports of the intermediate rotating member, and wherein the third apply passage is in communication with the second of the plurality of axial bores through the third of the plurality of side port of the input member and a third annular channel formed between the input member and the transmission housing, the second of the plurality of radial bores is in communication with the second of the plurality of axial bores through the fourth of the plurality of side ports of the input member and a fourth annular channel formed between the input member and the intermediate rotating member, and the second of the plurality of radial bores is in communication with the apply chamber of the third of the plurality of torque transmitting mechanisms through the second of the plurality of chamber ports of the intermediate rotating member.

27. The multi-speed transmission of claim 26 wherein the first dam fluid passage includes a first dam passage of the front portion of the transmission housing, a second radial bore, a third of the plurality of axial bores, a fifth and sixth of the plurality of side ports, and an end port of the input member, and a central bore, a side port, and a third and fourth of the plurality of the radial bores of the intermediate rotating member, wherein the first dam passage is in communication with the dam chamber of the first of the plurality of torque transmitting mechanisms through the second radial bore and the second chamber port of the input member and a second side port of the transmission housing, the first dam passage is in communication with the third of the plurality of axial bores of the input member through an open end of the first dam passage, a fifth annular channel formed between the transmission housing and the input member, and the fifth of the plurality of side ports of the input member, the third radial bore of the intermediate rotating member is in communication with the third axial bore of the input member through a sixth of the plurality of side ports, a radial passage formed through a bearing between the input member and the intermediate rotating member, and the third radial bore is in communication with the dam chamber of the second of the plurality of torque transmitting mechanisms through a fourth chamber port of the seventh interconnecting member, the fourth radial bore of the intermediate rotating member is in communication with the third axial bore of the input member through the side port and the central bore of the intermediate rotating member and the end port of the input member, and the fourth radial bore is in communication with the dam chamber of the third of the plurality of torque transmitting mechanisms through a fifth chamber port of the intermediate rotating member.

28. The multi-speed transmission of claim 27 wherein the fourth apply fluid passage is in communication with the apply chamber of the fourth of the plurality of torque transmitting mechanisms through a chamber port of the transmission housing.

29. The multi-speed transmission of claim 28 wherein the fifth apply fluid passage is in communication with the apply chamber of the fifth of the plurality of torque transmitting mechanisms through a second chamber port of the transmission housing and the second dam fluid passage is in communication with the dam chamber of the fifth of the plurality of torque transmitting mechanisms through a third chamber port of the transmission housing.

30. A multi-speed transmission comprising:
a transmission housing having a front portion, a center portion, and a rear portion, the front portion including a portion of each of a first, second, and third apply fluid passages and a first dam fluid passage, the center portion including a fourth apply fluid passage, and the central and rear portion including a fifth apply fluid passage and a second dam fluid passage;
an input member;
an intermediate rotating member;
a first, a second, a third, and a fourth planetary gear sets each having a sun gear, a ring gear, and a carrier member;
a first interconnecting member continuously interconnecting the sun gear of the first planetary gear set and the carrier member of the second planetary gear set;
a second interconnecting member continuously interconnecting the ring gear of the first planetary gear set with the ring gear of the fourth planetary gear set;

a third interconnecting member continuously interconnecting the sun gear of the second planetary gear set and the sun gear of the third planetary gear set;

a fourth interconnecting member continuously interconnecting the ring gear of the third planetary gear set with the carrier member of the fourth planetary gear set;

a first torque-transmitting mechanism having an actuating assembly and a clutch pack, the first torque-transmitting mechanism selectively engageable to interconnect the input member with the intermediate rotating member a second torque-transmitting mechanism having an actuating assembly and a clutch pack, the second torque-transmitting mechanism selectively engageable to interconnect the intermediate rotating member with the first interconnecting member;

a third torque-transmitting mechanism having an actuating assembly and a clutch pack, the third torque-transmitting mechanism selectively engageable to interconnect the intermediate rotating member with the carrier member of the first planetary gear set;

a fourth torque-transmitting mechanism having an actuating assembly and a clutch pack, the fourth torque-transmitting mechanism selectively engageable to interconnect the third interconnecting member with the transmission housing; and a fifth torque-transmitting mechanism having an actuating assembly and a clutch pack, the fifth torque-transmitting mechanism is selectively engageable to interconnect the carrier member of the third planetary gear set with the transmission housing; and wherein the input member is continuously interconnected to the ring gear of the second planetary gear set and rotatably supporting the actuating assembly of a first of the plurality of torque transmitting mechanisms, the input member having a plurality of axial bores, a plurality of radial bores, a plurality of chamber ports, a plurality of side ports, and an end port, wherein a first of the plurality of radial bores and a first of the plurality of chamber ports includes a portion of the first apply fluid passage, a first of the plurality of axial bores and a first and second of the plurality of side ports include a portion of the second apply fluid passage, a second of the plurality of axial bores and a third and fourth of the plurality of side ports include a portion of the second apply fluid passage, and a third of the plurality of axial bores, a second of the plurality of radial bores, a fifth and sixth of the plurality of side ports, and the end port include a portion of the first dam fluid passage;

wherein the intermediate rotating member rotatably supporting the actuating assemblies of a second and third of the plurality of torque transmitting mechanisms, the intermediate rotating member having a center bore, a plurality of radial bores and a plurality of ports, wherein a first of the plurality of radial bores and a first of the plurality of ports include a portion of the second apply fluid passage, a second of the plurality of radial bores and a second of the plurality of ports include a portion of the third fluid apply passage, and a third and fourth of a plurality of radial bores, a third and fourth of a plurality of ports, and the central bore include a portion of the first dam fluid passage; and wherein the first apply fluid passage and the first dam fluid passage are in communication with the actuating assembly of the first torque transmitting mechanism, the second apply fluid passage and the first dam fluid passage are in communication with the actuating assembly of the second torque transmitting mechanism, the third apply fluid passage and the first dam fluid passage are in communication with the actuating assembly of the third torque transmitting mechanism, the fourth apply fluid passage is in communication with the actuating assembly of the fourth torque transmitting mechanism, and the fifth apply fluid passage and the second dam fluid passage are in communication with the actuating assembly of the fifth torque transmitting mechanism.

31. The multi-speed transmission of claim 30 wherein the torque-transmitting mechanisms are selectively engageable in combinations of at least two to establish at least eight forward speed ratios and at least one reverse speed ratio between the input member and the output member.

32. The multi-speed transmission of claim 31 wherein the first apply fluid passage includes a first apply passage and a first side port of the front portion of the transmission housing and the first of the plurality of radial bores and the first of a plurality of chamber ports of the input member, and wherein the first apply fluid passage is in communication with the first of the plurality of radial bores through the first side port and the first of the plurality of radial bores is in communication with an apply chamber of the actuating assembly of the first torque transmitting mechanism through first chamber port of the input member.

33. The multi-speed transmission of claim 32 wherein the second apply fluid passage includes a second apply passage of the front portion of the transmission housing, a first of the plurality of axial bores and a first and second of the plurality of side ports of the input member, and a first of the plurality of the radial bores and a first of the plurality of chamber ports of the intermediate rotating member, and wherein the second apply fluid passage is in communication with the first of the plurality of axial bores through the first side port and a first annular channel formed between the input member and the transmission housing, the first of the plurality of radial bores is in communication with the first of the plurality of axial bores through the second of the plurality of side ports and a second annular channel formed between the input member and the intermediate rotating member, and the first of the plurality of radial bores is in communication with the apply chamber of the second torque transmitting mechanism through the first chamber port of the intermediate rotating member.

34. The multi-speed transmission of claim 33 wherein the third apply fluid passage includes a third apply passage of the front portion of the transmission housing, a second of the plurality of axial bores and a third and fourth of the plurality of side ports of the input member, and a second of the plurality of the radial bores and a second of the plurality of chamber ports of the intermediate rotating member, and wherein the third apply passage is in communication with the second of the plurality of axial bores through the third of the plurality of side port of the input member and a third annular channel formed between the input member and the transmission housing, the second of the plurality of radial bores is in communication with the second of the plurality of axial bores through the fourth of the plurality of side ports of the input member and a fourth annular channel formed between the input member and the intermediate rotating member, and the second of the plurality of radial bores is in communication with the apply chamber of the third torque transmitting mechanism through the second of the plurality of chamber ports of the intermediate rotating member.

35. The multi-speed transmission of claim 34 wherein the first dam fluid passage includes a first dam passage of the front portion of the transmission housing, a second radial bore, a third of the plurality of axial bores, a fifth and sixth of the plurality of side ports, and an end port of the input member, and a central bore, a side port, and a third and fourth of the plurality of the radial bores of the intermediate rotating member, wherein the first dam passage is in communication with the dam chamber of the first torque transmitting mechanism through the second radial bore and the second chamber port of the input member and a second side port of the transmission housing, the first dam passage is in communication with the third of the plurality of axial bores of the input member through an open end of the first dam passage, a fifth annular channel formed between the transmission housing and the input member, and the fifth of the plurality of side ports of the input member, the third radial bore of the intermediate rotating member is in communication with the third axial bore of the input member through a sixth of the plurality of side ports, a radial passage formed through a bearing between the input member and the intermediate rotating member, and the third radial bore is in communication with the dam chamber of the second torque transmitting mechanism through a fourth chamber port of the seventh interconnecting member, the fourth radial bore of the intermediate rotating member is in communication with the third axial bore of the input member through the side port and the central bore of the intermediate rotating member and the end port of the input member, and the fourth radial bore is in communication with the dam chamber of the third torque transmitting mechanism through a fifth chamber port of the intermediate rotating member.

36. The multi-speed transmission of claim 35 wherein the fourth apply fluid passage is in communication with the apply chamber of the fourth torque transmitting mechanism through a chamber port of the transmission housing.

37. The multi-speed transmission of claim 36 wherein the fifth apply fluid passage is in communication with the apply chamber of the fifth torque transmitting mechanism through a second chamber port of the transmission housing and the second dam fluid passage is in communication with the dam chamber of the fifth torque transmitting mechanism through a third chamber port of the transmission housing.

* * * * *